(12) United States Patent
Alton et al.

(10) Patent No.: US 9,766,459 B2
(45) Date of Patent: Sep. 19, 2017

(54) DISPLAY DEVICES WITH DIMMING PANELS

(71) Applicant: MICROSOFT TECHNOLOGY LICENSING, LLC, Redmond, WA (US)

(72) Inventors: Daniel James Alton, Bellevue, WA (US); Nathan Ackerman, Seattle, WA (US); Andrew Hodge, Palo Alto, CA (US); Philip Andrew Frank, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 337 days.

(21) Appl. No.: 14/262,505

(22) Filed: Apr. 25, 2014

(65) Prior Publication Data
US 2015/0309312 A1    Oct. 29, 2015

(51) Int. Cl.
*G09G 5/00* (2006.01)
*G02B 27/01* (2006.01)
(Continued)

(52) U.S. Cl.
CPC ........ *G02B 27/0172* (2013.01); *G06T 19/006* (2013.01); *G09G 5/026* (2013.01);
(Continued)

(58) Field of Classification Search
CPC ............ G02B 27/0172; G02B 27/0093; G02B 2027/0138; G02B 2027/0187;
(Continued)

(56) References Cited

U.S. PATENT DOCUMENTS

| 7,505,136 B2 | 3/2009 | Romig et al. |
| 7,970,172 B1 | 6/2011 | Hendrickson |
(Continued)

FOREIGN PATENT DOCUMENTS

| JP | H08-160340 A | * | 6/1996 |
| JP | H08-160340 A | | 6/1996 |
| JP | 2008-046562 A | | 2/2008 |

OTHER PUBLICATIONS

International Search Report & Written Opinion Received mailed Jun. 29, 2015, in PCT Patent Application No. PCT/US2015/026053 filed Apr. 16, 2015.
(Continued)

*Primary Examiner* — Ilana Spar
*Assistant Examiner* — Brent D Castiaux
(74) *Attorney, Agent, or Firm* — Vierra Magen Marcus LLP (57) ABSTRACT

Described herein are display devices, and methods for use therewith. Such a device can be used to display one or more virtual images within a first see-through portion of the device, adjacent to which is a second see-through portion that does not overlap with the first see-through portion. The first and second see-through portions of the device collectively cover a substantially entire field-of-view (FOV) of a user. A transmittance (and/or other optical characteristic(s)) corresponding to the first see-through portion of the device and a transmittance (and/or other optical characteristic(s)) corresponding to the second see-through portion of the device can be caused (e.g., controlled) to be substantially the same to provide a substantially uniform transmittance (and/or other optical characteristic(s)) across the substantially entire FOV of a user. More generally, optical characteristics of see-through portions of the device can be controlled, e.g., by a user and/or through feedback.

20 Claims, 6 Drawing Sheets

(51) Int. Cl.
*G06T 19/00* (2011.01)
*G09G 5/02* (2006.01)
*G09G 5/377* (2006.01)
*G02B 27/00* (2006.01)
*G09G 3/00* (2006.01)
*G09G 3/34* (2006.01)

(52) U.S. Cl.
CPC ......... *G09G 5/377* (2013.01); *G02B 27/0093* (2013.01); *G02B 2027/014* (2013.01); *G02B 2027/0118* (2013.01); *G02B 2027/0138* (2013.01); *G02B 2027/0178* (2013.01); *G02B 2027/0187* (2013.01); *G06T 2200/24* (2013.01); *G06T 2210/62* (2013.01); *G09G 3/003* (2013.01); *G09G 3/34* (2013.01); *G09G 2310/0232* (2013.01); *G09G 2320/0233* (2013.01); *G09G 2320/066* (2013.01); *G09G 2320/0613* (2013.01); *G09G 2320/0666* (2013.01); *G09G 2354/00* (2013.01); *G09G 2360/144* (2013.01)

(58) Field of Classification Search
CPC ...... G02B 2027/014; G02B 2027/0178; G02B 2027/0118; G09G 5/00; G09G 5/377; G09G 5/026; G09G 2320/0613; G09G 2320/0666; G09G 2320/066; G09G 2360/144; G09G 2354/00; G06T 19/006; G06T 2210/62; G06T 2200/24

See application file for complete search history.

(56) References Cited

U.S. PATENT DOCUMENTS

| | | | |
|---|---|---|---|
| 8,380,393 | B1 | 2/2013 | Ohtomo |
| 8,482,859 | B2 | 7/2013 | Border et al. |
| 2005/0023356 | A1 | 2/2005 | Wiklof et al. |
| 2011/0181541 | A1 | 7/2011 | Kuo |
| 2012/0200595 | A1* | 8/2012 | Lewis ............... G02B 27/017 345/619 |
| 2012/0320100 | A1* | 12/2012 | Machida ........... G02B 27/017 345/690 |
| 2013/0101253 | A1 | 4/2013 | Popovich et al. |
| 2013/0108229 | A1 | 5/2013 | Starner et al. |
| 2013/0114043 | A1 | 5/2013 | Balan et al. |
| 2013/0241907 | A1 | 9/2013 | Amirparviz et al. |

OTHER PUBLICATIONS

Office Action Dec. 2, 2016 in European Patent Application No. 15719557.9.

Response to Office Action filed Jan. 5, 2017 in European Patent Application No. 15719557.9.

* cited by examiner

DISPLAY DEVICES WITH DIMMING PANELS

BACKGROUND

Augmented or mixed reality is a technology that allows virtual imagery to be mixed with a user's actual view of the real world. A see-through, near eye display device may be worn by a user to view the mixed imagery of virtual and real objects. The display device displays virtual imagery within a portion of the user's field-of-view. More specifically, virtual imagery is displayed within a see-through display region of the display device, which may include left and right sub-regions for viewing by the left and right eyes of the user. While such a display region is see-through, the display region has optical characteristics, such as a transmittance, that affects (e.g., attenuates) ambient visible light that is incident on the display region. For example, the display region may have a 70 percent transmittance, meaning that only 70 percent of the ambient visible light intensity that is incident on the display region travels through the display region and is incident on the user's eyes. Another way of explaining this is that the display region may cause ambient visible light to be dimmed by 30 percent. Since the display region does not occupy the user's entire field-of-view, this causes a non-uniformity where some of the user's field-of-view will be darker than others.

SUMMARY

Certain embodiments described herein relate to user wearable see-through, near-eye mixed reality display devices, and methods for use therewith. Such a device can be used to display one or more virtual images within a first see-through portion of the device, adjacent to which is a second see-through portion of the device that does not overlap with the first see-through portion, wherein the first and second see-through portions of the device collectively cover a substantially entire field-of-view (FOV) of a user wearing the device. In accordance with an embodiment, a transmittance corresponding to the first see-through portion of the device and a transmittance corresponding to the second see-through portion of the device can be caused (e.g., controlled) to be substantially the same to thereby provide for a substantially uniform transmittance across the substantially entire FOV of a user wearing the device. More generally, optical characteristics (such as color or transmission spectrum) of different see-through portions of the device can be made to be substantially the same so that substantially uniform optical characteristics are achieved for the substantially entire FOV of a user wearing the device. Such embodiments can be used to prevent some of the user's field-of-view from being darker than others. Unless stated otherwise, as the terms "overlap" and "overlapping" are used herein, if a first element is described as overlapping a second element, then first element completely or at least substantially overlaps the second element.

In certain embodiments, the first see-through portion of the display device includes a see-through display region, and a second see-through portion of the display device includes a see-through dimming panel adjacent to but not overlapping the see-through display region. In such embodiments one or more virtual images are displayed within the see-through display region, and the transmittance (and/or other optical characteristics) of the see-through (passive or active) dimming panel, that is adjacent to but not overlapping the see-through display region, is caused (e.g., controlled) to be substantially the same as a transmittance (and/or other optical characteristics) of the see-through display region. In an embodiment, a further see-through dimming panel can overlap both the see-through display region and the see-through dimming panel that is adjacent to the see-through display region.

In other embodiments, the first see-through portion of the display device includes a see-through display region and a see-through dimming panel that overlaps the see-through display region, and the second see-through portion of the display device includes a further see-through dimming panel adjacent to but not overlapping both the see-through display region and the see-through dimming panel that overlaps the see-through display region. In such embodiments, a transmittance of the further see-through (passive or active) dimming panel is caused (e.g., controlled) to be substantially equal to a product of a transmittance of the see-through display region multiplied by a transmittance of the see-through dimming panel that overlaps the see-through display region.

Depending upon implementation, a user can interact with a user interface to selectively change the transmittance (and/or other optical characteristics) of one or more see-through portions of the head mounted display device. Additionally, or alternatively, a user can interact with a user interface to control a see-through contrast ratio (STCR) associated with the portion of the display device including the see-through display region.

Additionally, or alternatively, one or more sensors can be used to detect ambient visible light that is incident on the head mounted display device and produce one or more signals indicative thereof. In such an embodiment, transmittances and/or other optical characteristics can be adjusted based on one or more signals produced by the sensor(s).

In other embodiments, visible light that traveled through the first see-through portion of the device is detected and one or more signals indicative thereof are produced. Similarly, visible light that traveled through the second see-through portion of the device is detected and one or more signals indicative thereof are produced. In such embodiments, the transmittance (and/or other optical characteristics) corresponding to the first see-through portion of the device and the transmittance (and/or other optical characteristics) corresponding to the second see-through portion of the device are caused (e.g., controlled) to be substantially the same in dependence on at least one signal indicative of the visible light that traveled through the first see-through portion of the device and at least one signal indicative of the visible light that traveled through the second see-through portion of the device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Certain embodiments of the present technology relate to see-through, near-eye mixed reality display devices that provide substantially uniform optical characteristics (e.g., transmittances) for the substantially entire FOV of a user wearing the device. However, before discussing such embodiments in additional detail, it is first useful to describe an exemplary see-through, mixed reality display device system with which embodiments of the present technology can be used.

Figure 1:
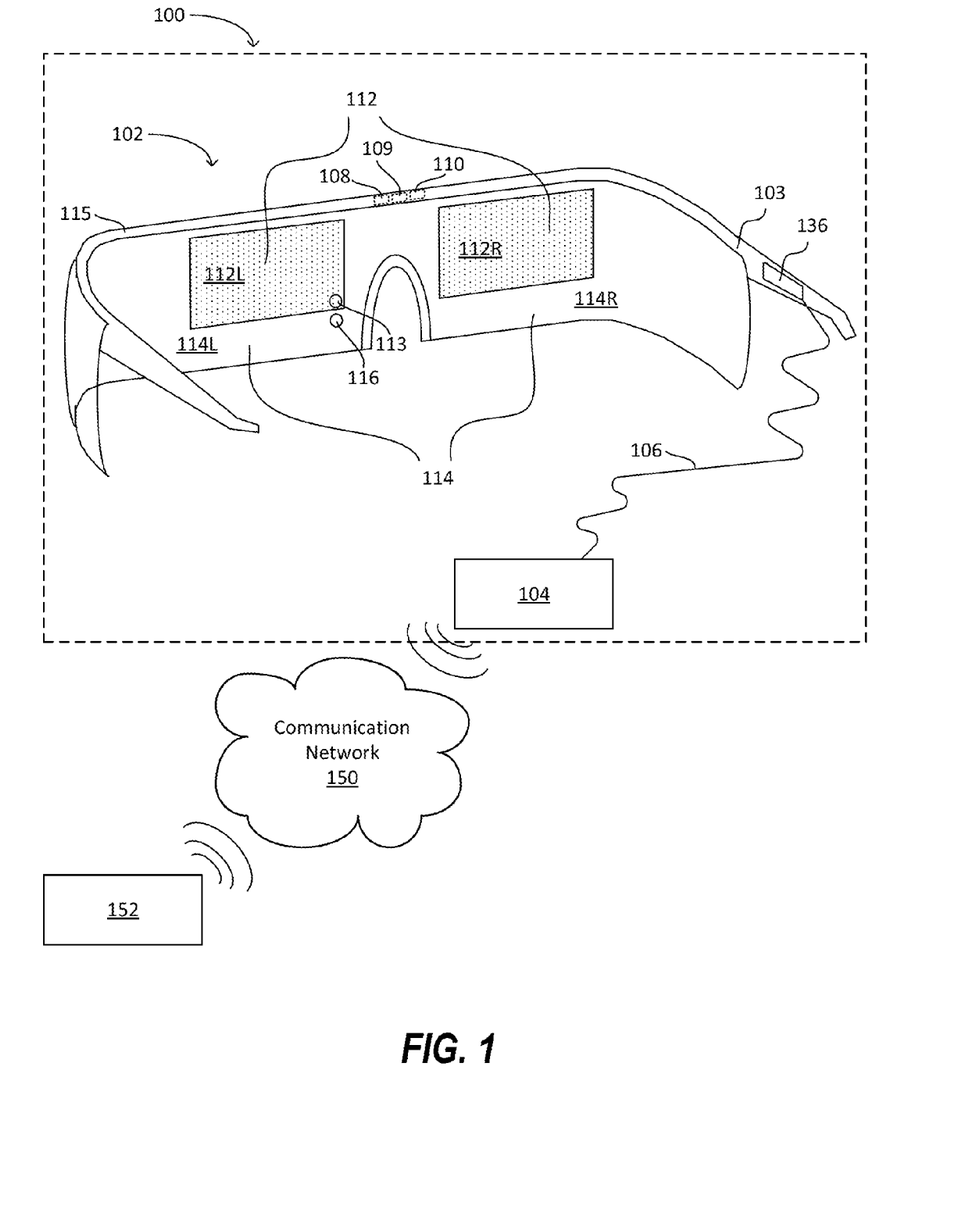
FIG. 1 illustrates an exemplary see-through, near-eye mixed reality display device system.

FIG. 1 illustrates example components of a see-through, near-eye mixed reality display device system 100. The system 100 includes a head mounted see-through, near-eye mixed reality display device 102, which can also be referred to herein simply as a head mounted display device 102, or even more succinctly as a display device 102. The head mounted display device 102 is shown as being in communication with a processing unit 104 via a wire 106. In other embodiments, the head mounted display device 102 communicates with the processing unit 104 via wireless communication. The processing unit 104 may take various embodiments. For example, the processing unit 104 may be embodied in a mobile device like a smart phone, tablet or laptop computer. In some embodiments, the processing unit 104 is a separate unit which may be worn on the user's body (e.g., on the user's wrist) or kept in a pocket, and includes much of the computing power used to operate the head mounted display device 102. The processing unit 104 may communicate wirelessly (e.g., WiFi, Bluetooth, infrared, RFID transmission, wireless Universal Serial Bus (WUSB), cellular, 3G, 4G or other wireless communication means) over a communication network 150 to one or more hub computing systems 152 whether located nearby in this example or at a remote location. In other embodiments, the functionality of the processing unit 104 may be integrated in software and hardware components of the display device 102.

The head mounted display device 102, which in one embodiment has the shape or form factor of wrap around eyeglasses, is intended to be worn on the head of a user so that the user can see through a display region 112 and a peripheral region 114, and thereby have an actual direct view of the space in front of the user. In FIG. 1, the see-through display region 112 is shown as including left and right see-through display sub-regions 112L and 112R respectively for viewing by the user's left and right eyes.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, within the see-through display region 112 that are viewable by the person wearing the display device 102 while that person is also viewing real world objects through the see-through display region 112 and through a peripheral region 114 that is adjacent to but does not overlap the see-through display region 112, thereby providing an augmented reality experience. In FIG. 1, the see-through peripheral region 114 is shown as including left and right see-through peripheral sub-regions 114L and 114R that are respectively within the field-of-view of the user's left and right eyes.

Still referring to FIG. 1, a frame 115 provides a support for holding various elements of the system in place as well as a conduit for electrical connections. In this embodiment, the frame 115 provides a convenient eyeglass frame as support for the elements of the system discussed further below. In other embodiments, other support structures can be used. An example of such a structure is a visor or goggles. Embodiments of the present technology are not limited to the shapes and relative dimensions of the components of the head mounted display device 102 shown in FIG. 1. Rather, components, such as the frame 115, the see-through display region 112 and the see-through peripheral region 114 can have different shapes and/or dimensions than shown. For example, the see-through display region 112 and the see-through peripheral region 114 can be curved relative to both vertical and horizontal axes. For another example, the see-through display region 112 may be larger than shown, in which case the see-through peripheral region 114 may be smaller than shown.

The frame 115 includes left and right temples or side arms for resting on the user's ears. The temple 103 is representative of an embodiment of the right temple and includes control circuitry 136 for the display device 102. The control circuitry 136 can alternatively be located at a different position or distributed among multiple locations. In FIG. 1, a nose bridge portion of the frame 115 is shown as including an outwardly facing light sensor 108, an outwardly facing camera 109 and an outwardly facing microphone 110. However, one or more of the light sensor 108, the camera 109 and the microphone 110 can be located on other portions of the frame 115. The light sensor 108 can be used, e.g., for detecting ambient light characteristics (e.g., brightness, color content, spectrum, type of illuminant). The camera 109 can be used for capturing video and/or still images, which may include RGB and/or depth images, but is not limited thereto. The microphone 110 can be used for recording sounds and/or accepting voice commands. Data obtained using the light sensor 108, the camera 109 and/or the microphone 110 can be provided to the control circuitry 136 and/or transmitted to the processing unit 104. It is also possible that there are two outwardly facing cameras 109, e.g., one corresponding to a left eye and one corresponding to a right eye.

The outwardly facing light sensor 108 that is located on frame 115 can be used to detect characteristics, such as the intensity, of ambient light that has not yet traveled through the see-through display region or the see-through peripheral region 114. The head mounted display device 102 can also include additional light sensors to detect characteristics, such as the intensity, of ambient light that traveled through the see-through display region 112 and/or the see-through peripheral region 114. For example, still referring to FIG. 1, a light sensor 113 can be used to detect characteristics, such as the intensity, of ambient light that traveled through the see-through display region 112. Additionally, or alternatively, a light sensor 116 can be used to detect characteristics, such as the intensity, of ambient light that traveled through the see-through peripheral region 114. Each of the light sensors 108, 113 and 116 can be designed to be primarily responsive to visible light, e.g., by including optical filters that reflect and/or absorb wavelengths (e.g., infrared wavelengths) outside of the visible spectrum. For example, the light sensor 108, 113 and 116 can be designed to have a photopic response.

The control circuitry 136 provide various electronics that support the other components of head mounted display device 102. Exemplary details of the control circuitry 136 are discussed below with respect to FIG. 5. While not specifically shown in FIG. 1, elements such as ear phones, inertial sensors, a GPS transceiver and/or a temperature sensor can be mounted inside or to the temple 103. In one embodiment, such inertial sensors include a three axis magnetometer, a three axis gyro and a three axis accelerometer. The inertial sensors can be used for sensing position, orientation, and sudden accelerations of head mounted display device 102. From these movements, head position may also be determined Some additional details of these sensors are described below with reference to FIG. 5.

As mentioned above, a user wearing the head mounted display device 102 can view virtual images, and real images, through the see-through display region 112. The user wearing the display device can also view real images through the see-through peripheral region 114. The virtual images can be generated by one or more micro-display devices (not specifically shown in FIG. 1, but discussed below with reference to FIG. 5) mounted in or to the frame 115, and optical elements such as waveguides, mirrors and/or the like, can be used to transfer or guide the virtual images to the see-through display region 112. Alternatively, left and right see-through micro-displays can be located in or on left and right see-through lenses or some other see-through substrate to provide the see-through display region 112. In other words, one or more micro-display devices located on the frame 115 can generate virtual images that are transferred to the see-through display region 112 using one or more waveguides, mirrors and/or the like, or alternatively the virtual images displayed in the see-through display region 112 can be generated using see-through displays that are coextensive with the see-through display region 112.

There are different image generation technologies that can be used to implement such see-through displays or micro-display devices. For example, transmissive projection technology can be used, where a light source is modulated by an optically active material and backlit with white light. These technologies are usually implemented using liquid crystal display (LCD) type displays with powerful backlights and high optical energy densities. Alternatively, a reflective technology, in which external light is reflected and modulated by an optically active material, can be used. Digital light processing (DLP), liquid crystal on silicon (LCOS) and Mirasol® display technology from Qualcomm, Inc. are all examples of reflective technologies. Additionally, such see through micro-displays or micro-display devices can be implemented using an emissive technology where light is generated by the display, see for example, a PicoP™ display engine from Microvision, Inc. Another example of emissive display technology is a micro organic light emitting diode (OLED) display. Companies eMagin and Microoled provide examples of micro OLED displays.

In accordance with certain embodiments, regardless of the type of technology used to generate virtual images that are observable within the see-through display region 112, the see-through display region 112 does not take up the entire field-of-view (FOV) of the user wearing the head mount display device 102. Rather, at least a portion of the see-through peripheral region 114 will also be within the FOV of the user wearing the head mounted display device 102. In alternative embodiments, the see-through display region 112 takes up the entire FOV of the user, in which case, the see-through dimming panel 202 may be eliminated and the see-through dimming panel 204 may be coextensive with the see-through display region that takes up the entire FOV. In such alternative embodiments, the see-though dimming panel 204 can be an active dimming panel that can be controlled to adjust a see-through contrast ratio (STCR) and/or other optical characteristics.

As mentioned above, while the display region 112 is see-through, the display region 112 has optical characteristics, such as a transmittance, that affect (e.g., attenuate) ambient visible light that is incident on the display region 112. For an example, the see-through display region 112 may have a 70 percent transmittance for visible light, meaning that only 70 percent of the ambient visible light that is incident on the see-through display region 112 will pass through the see-through display region 112 and be incident on the user's eyes, with the remaining 30 percent of the ambient visible light being reflected and/or absorbed by the see-through display region 112. Another way of explaining this is that the see-through display region 112 may cause ambient visible light to be dimmed by 30 percent. Since the see-through display region 112 does not occupy the user's entire FOV, if its optical characteristics are not accounted for, this will cause a non-uniformity in optical characteristics where some of the user's FOV will be darker than others. Embodiments of the present technology, described below in more detail with reference to FIGS. 2A, 2B, 3A and 3B, can be used to maintain substantially uniform optical characteristics, including a substantially uniform transmittance, across substantially the entire FOV of a user wearing the head mounted display device 102.

Figure 2A:
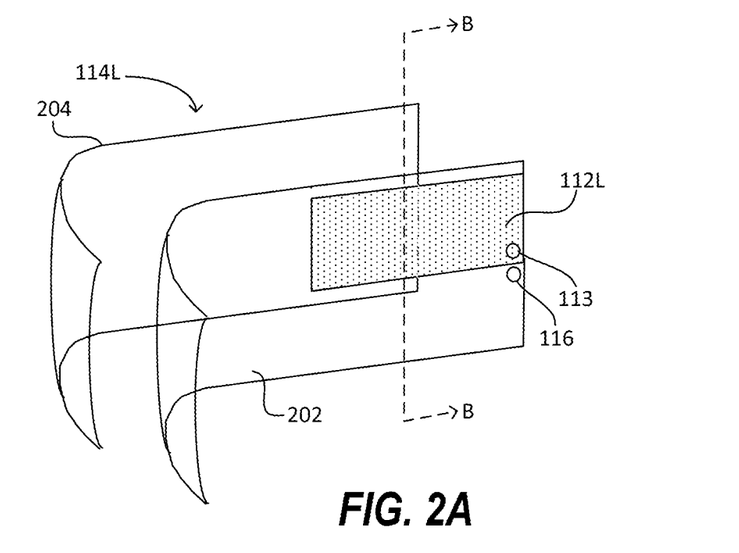
FIG. 2A illustrates components of the see-through, near-eye mixed reality display device introduced in FIG. 1, according to an embodiment.

FIG. 2A is an exploded view of some elements of the left portion of the head mounted display device 102 introduced in FIG. 1, according to an embodiment. Referring to FIG. 2A, shown therein is the left see-through display sub-region 112L, which as noted above, is part of the see-through display region 112 along with the right see-through display sub-region 112R (shown in FIG. 1). Also shown in FIG. 2A is a left portion of a see-through dimming panel 202 that is adjacent to but not overlapping the left see-through display sub-region 112L. Although not shown in FIG. 2A, the see-through dimming panel 202 also includes a right portion that is adjacent to but not overlapping the right see-through display sub-region 112R. More specifically, in the embodiment of FIG. 2A, the see-through dimming panel 202 is coextensive with the see-through peripheral region 114 described with reference to FIG. 1. Unless stated otherwise, as the terms "overlap" and "overlapping" are used herein, if a first element is described as overlapping a second element, then first element completely or at least substantially overlaps the second element. Preferably, the see-through display region 112 and the see-through dimming panel 202 collectively cover substantially the entire FOV of a user wearing the head mounted display device 102.

In accordance with an embodiment, a transmittance of the see-through dimming panel 202 is substantially the same as a transmittance of the see-through display region 112. Beneficially, this prevents some of the user's FOV from being darker than others. Explained another way, this provides for a substantially consistent brightness across the user's entire FOV. Additionally, or alternatively, one or more other optical characteristic of the see-through dimming panel 202 and the see-through display region 112 can be substantially the same.

In an embodiment, the see-through display region 112 has a static transmittance. In such a case, the see-through dimming panel 202 can be a static dimming panel having a static transmittance that is substantially equal to the static transmittance of the see-through display region 112. The see-through dimming panel 202 can be made of glass, plastic or some other transparent material. Such a transparent material can be coated with a tinted film or mirror coated film that provides the see-through dimming panel 202 with its desired optical characteristics, e.g., a transmittance that is substantially the same as the transmittance of the see-through display region 112. Alternatively, the transparent material from which the see-through dimming panel 202 is made can provide for the desired optical characteristics (e.g., a desired transmittance) without being coated with a tinted film or mirror coated film.

In accordance with an alternative embodiment, the see-through display region 112 has a transmittance (and/or one or more other optical characteristics) that changes. The transmittance (and/or one or more other optical characteristics) of the see-through display region 112 may change, e.g., in response to user inputs, in response to signals from the control circuitry 136 and/or in response to signals from the light sensor 108, but is not limited thereto. For example, a user may be able to change the transmittance (and/or other optical characteristics) of the see-through display region 112 using one or more buttons, a slider or some other tactile user interface (e.g., 543 in FIG. 5) located on the frame 115 of the head mounted display device 102 or using a user interface on a mobile computing device (e.g., a smartphone or tablet) that communicates with the head mounted display device 102.

Where the see-through display region 112 has a transmittance (and/or one or more other optical characteristics) that changes, the see-through dimming panel 202 should also have a transmittance (and/or one or more other optical characteristics) that changes so that the transmittance (and/or one or more other optical characteristics) of the see-through dimming panel 202 can be dynamically adjusted to remain substantially the same as the transmittance (and/or one or more other optical characteristics) of the see-through display region 112. For a specific example, control circuitry 136 can monitor the transmittance (and/or other optical characteristics) of the see-through display region 112, and adjust the transmittance (and/or other optical characteristics) of the see-through dimming panel 202 so that the transmittances (and/or other optical characteristics) of the see-through dimming panel 202 and the see-through display region 112 are substantially the same. Exemplary technologies that can be used to provide a see-through dimming panel 202 that has a transmittance that can be changed, and more generally, that has one or more optical characteristics that can be changed, are discussed below.

While transmittance is the optical characteristic most often discussed herein, it is also within the scope of an embodiment that other optical characteristics (besides or in addition to transmittance) of the see-through dimming panel 202 (and other see-through dimming panels discussed herein) can be dynamically controlled to be substantially the same as the corresponding optical characteristics of the see-through display region 112. Examples of such other optical characteristics include, but are not limited to, spectral profile and color shift properties.

Figure 2B:
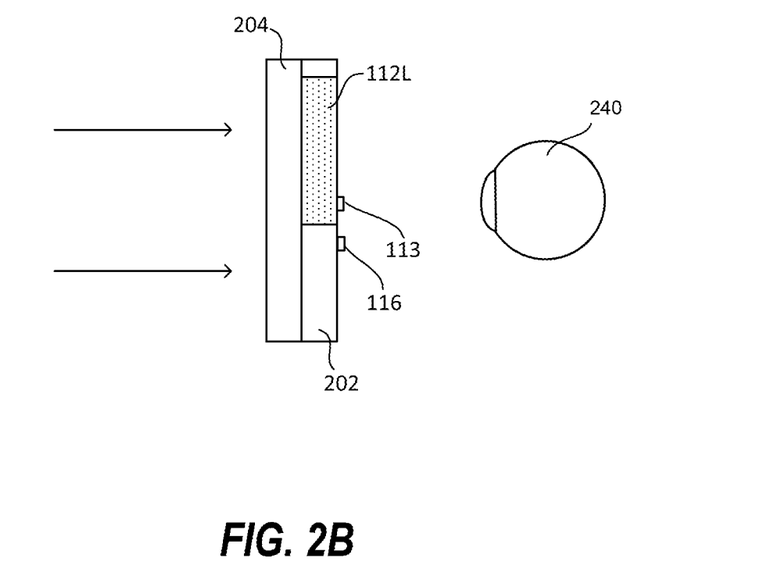
FIG. 2B is a cross-section of the components shown in FIG. 2A along line B-B in FIG. 2A.

Still referring to FIG. 2A, a further see-through dimming panel 204 overlaps both the see-through display region 112 and the see-through dimming panel 202. Assuming that the see-through display region 112 is within a first portion of the FOV of a user wearing the head mounted display device 102, and that the see-through dimming panel 202 is within a second portion of the user's FOV, then the further see-through dimming panel 204 is within both the first and second portions of the FOV of the user wearing the device 102. The further see-through dimming panel 204 has corresponding optical characteristics, including, but not limited, a corresponding transmittance. While in the exploded view of FIG. 2A the dimming panels 202 and 204 are shown as being spaced apart from one another, the panels 202 may be in contact with one another, as shown in FIG. 2B, which illustrates a cross-section along the dashed line B-B in FIG. 2A. Alternatively, there can be an air gap or a see-through material (e.g., a lens) between the dimming panels 202 and 204. There can also be a cavity or space between the dimming panels 202 and 204 that may contain other optical and/or electro-optical component(s), and/or one or more other types of component(s).

In accordance with an embodiment, the further see-through dimming panel 204 is a static dimming panel having static transmittance, and more generally, static optical characteristics. Alternatively, the further see-through dimming panel 204 can have a transmittance (and/or other optical characteristics) that can be changed. Exemplary technologies that can be used to enable the transmittance (and/or other optical characteristics) of the see-through dimming panel 204 to be changed are discussed below.

Where light travels through two different elements, each having their own transmittance, the collective transmittance of the two elements is equal to a product of the two transmittances multiplied. For example, if the transmittance of the see-through dimming panel 202 is 70 percent, and the transmittance of the further see-through dimming panel 204 is 80 percent, then the two panels 202 and 204 have a collective transmittance of 56 percent (i.e., 0.70×0.80=0.56). Because the further see-through dimming panel 204 overlaps both the see-through display region 112 and the see-through dimming panel 202, the transmittance for the entire see-through portion of the head mounted display device 102 should remain substantially the same regardless of the transmittance of the further see-through dimming panel 204, so long as the transmittance of the see-through dimming panel 202 is substantially the same as the transmittance of the see-through display region 112.

Various different technologies can be used to provide a see-through dimming panel (202 and/or 204) that has a transmittance that can be changed, and more generally, that has one or more optical characteristics that can be changed. For example, the see-through dimming panel 202 (and/or the further see-through dimming panel 204) can be or include an electrochromic (EC) element having a transmittance that changes in response to changes in an applied voltage, and thus, allows control over the amount of ambient visible light that passes through the dimming panel.

In another embodiment, the see-through dimming panel 202 (and/or the further see-through dimming panel 204) can be or include a suspended particle device (SPD) element. Such an SPD element can, e.g., be implemented as a thin film laminate of rod-like nano-scale particles suspended in a liquid between two pieces of glass or plastic. When no voltage is applied to the SPD element, the suspended particles are randomly organized which results in the particles blocking light, and thus, causes a low transmittance. When a voltage is applied, the suspended particles align and let light pass therethrough, thereby increasing the transmittance. Varying the voltage applied to the SPD element varies the orientation of the suspended particles, thereby changing the transmittance.

In still other embodiments, the see-through dimming panel 202 (and/or the further see-through dimming panel 204) can be or include a liquid crystal (LC) element or a polymer dispersed liquid crystal (PDLC) element. A PDLC element can be produced, e.g., by dispersing liquid crystals in a liquid polymer placed between two layers of transparent glass or plastic and then solidifying or curing the liquid polymer, which results in droplets throughout the solid polymer. When no voltage is applied to transparent electrodes of the PDLC element, the liquid crystals are randomly arranged in the droplets, which resulting in scattering of light as it passes through the PDLC element. However, when a voltage is applied to the electrodes, an electric field formed between the two transparent electrodes causes the liquid crystals to align, which allows light to pass through the droplets with less scattering. The transmittance of a PDLC element can thereby be controlled by varying the applied voltage.

There are many types of liquid crystal (LC) technologies that enable electronic control of light transmission, such as Twisted-Nematic (TN) and Guest-Host (GH) types. Some LC technologies utilizes polarizers (e.g., TN type), where incoming light is polarized into certain direction, and output through another polarizer after traversing a liquid crystal layer, which may or may not rotate the light's polarization depending on the electronic control. The rotation of the light polarization leads to change in light transmission off the second polarizer. In non-polarizer types, the individual liquid crystal molecules can be mixed with dye molecules that change light transmission depending on the presence or absence of an electric field, which may be controlled by an electronic driver.

In an embodiment, the see-through dimming panel 202 (and/or the further see-through dimming panel 204) can be or include a photonic crystal element, a photochromic element or a thermochromic. Photonic crystal technology is an extension of the liquid crystal technology, where certain periodicity in structure leads to the formation of a photonic crystal, which allows control of light transmission as a function of frequencies (essentially a photonic bandgap similar to semiconductor bandgap effects). This allows large dynamic range control of light, e.g., <0.1% transmission, to >99% transmission of light, or half-way 50% transmission. The non-transmitted light energy is reflected off the panel.

Photochromic technology relies on photo-assisted processes (typically it requires illumination by UV light, or visible light in more recent technologies), where dyes/compounds undergo reversible photochemical reaction, which changes the transmission of visible light. This is typically not electronically controlled, rather it is controlled by the intensity of illuminating light. This is the technology used in switchable sunglasses that turns dark when exposed to sunlight (UV-rich source). Thermochromic technology is similar to photochromic, except it is induced by temperature/thermal energy instead of illuminating light, to change visible light transmission. It is typically not electronically controlled.

In another embodiment, the see-through dimming panel 202 (and/or the further see-through dimming panel 204) can be or include a MEMS micro-blinds element that controls the amount of light that passes through the panel in response to an applied voltage. Such micro-blinds can, e.g., include rolled thin metal blinds on a glass or plastic substrate, where the blinds are so small that they are practically invisible to the human eye. With no applied voltage, the micro-blinds remain rolled and let light pass therethrough, thereby achieving a relatively high transmittance. However, when a voltage is applied to provide a potential difference between the rolled metal layer and a transparent conductive layer, an electric field is formed that causes the rolled micro-blinds to stretch out and thus block light, which reduces the transmittance of the panel. Thus, by varying the applied voltage, the transmittance of the MEMS micro-blinds element can be changed. It is also possible that other types of technologies, besides those listed herein, can be used to provide a see-through dimming panel (202 and/or 204) that has a transmittance and/or one or more other optical characteristics that can be changed, either by a user, and/or through use of feedback, e.g., from the light sensors described herein.

Where both the see-through dimming panel 202 and the further see-through dimming panel 204 have transmittances that can be changed, the same type of technology can be used to implement both panels 202 and 204, or a different type of technology can be used to implement the panel 204 than is used to implement the panel 202. Where an optical characteristic (e.g., transmittance) of a see-through dimming panel (202 or 204) can be changed, the see-through dimming panel can be referred to as an active see-through dimming panel. Where optical characteristics (e.g., transmittance) of a see-through dimming panel (202 or 204) cannot be changed, the see-through dimming panel can be referred to as a static see-through dimming panel.

In accordance with certain embodiments, the see-through dimming panel 204 is an active dimming panel having a transmittance that is adjusted in dependence on ambient visible light that is incident on the light sensor 108 shown in and discussed with reference to FIG. 1. More specifically, the light sensor 108 can detect ambient visible light that is incident on the sensor and in response thereto can produce one or more signals indicative of one or more characteristics (e.g., intensity) of the detected ambient visible light. The one or more signals produced by the light sensor 108 can be provided to the control circuitry 136 and/or the processing unit 104, at least one of which can adjust the transmittance of the see-through dimming panel 204 in dependence on at least one of the one or more signals produced by the light sensor 108. Such an embodiment can be used, e.g., to maintain a substantially constant brightness for the user as ambient light levels change. For example, assume that when ambient light levels are relatively high, the transmittance of the see-through dimming panel 204 is relatively low. When ambient light levels decrease, the transmittance of the see-through dimming panel 204 can be increased in an attempt keep the amount of ambient light that reaches the user's eyes relatively static, or to at least reduce the extent of the fluctuations in ambient light levels that reach the user's eyes.

In addition to, or instead of, using the light sensor 108 to detect characteristics of ambient light that is incident on an outer portion of the head mounted display device 102, the light sensor 113 can be used to detect characteristics (e.g., intensity and/or color content) of light that has traveled through both the see-through dimming panel 204 and the see-through display region 112, and the light sensor 116 can be used to detect characteristics (e.g., intensity and/or color content) of light that has traveled through both the see-through dimming panel 204 and the see-through dimming panel 202. Each of the light sensors 113 and 116 can produce one or more signals indicative of one or more characteristics (e.g., intensity and/or color content) of the light detected by the respective sensor. Such signals produced by the light sensors 113 and 116 can be provided to the control circuitry 136 and/or the processing unit 104, at least one of which can adjust the transmittance (and/or other optical characteristics) of the see-through dimming panel 202, the see-through dimming panel 204 and/or the see-through display region 112 to achieve substantially uniform optical characteristics (e.g., a substantially uniform transmittance) across substantially the entire FOV of a user wearing the head mounted display device 102. The positions of light sensors 113 and 116 can be different than shown in the FIGS. It is also possible that multiple spatially separated light sensors 113 can be used to detect characteristics (e.g., intensity) of light that has traveled through both the see-through dimming panel 204 and the see-through display region 112, and that multiple spatially separated light sensors 116 can be used to detect characteristics (e.g., intensity) of light that has traveled through both the see-through dimming panel 204 and the see-through dimming panel 202.

In accordance with certain embodiments, the see-through dimming panel 204 can be used to control a see-through contrast ratio (STCR) associated with the portion of the device 102 that includes the see-through display region 112. For example, the see-through dimming panel 204 can be used to allow a user to adjust the STCR, or to maintain a substantially constant STCR. For the portion of the device 102 that includes the see-through display region 112, the see-through contrast ratio (STCR) refers to the ratio of the total brightness of visible light emanating from the viewing side of the of the device 102 (which includes visible light emitted by the see-through display region 112 plus ambient visible light that passes through both the dimming panel 204 and the see-through display region 112) over the brightness of the ambient visible light emanating from the viewing side of the of the device 102 (which includes the brightness of the ambient visible light that passes through both the dimming panel 204 and the see-through display region 112). The viewing side of a device refers to the side that faces a user of the device, and more specifically, the side of the device 102 that faces the user's eyes. Where the brightness of the see-through display region 112 is adjustable, the STCR can additionally, or alternatively, be controlled by adjusting the brightness of the see-through display region 112. In accordance with certain embodiments, the STCR can be determined based on signals received from one or more of the light sensors described herein, the transmittance of the see-through dimming panel 204 and/or the transmittance of see-through display region 112. Signals received from one or more of the light sensors described herein can be used in a closed loop feedback system to maintain a substantially constant STCR. The substantially constant STCR can be a default STCR level, an STCR level specified by a user using a user interface, or an STCR level specified by an application that the device 102 executes. In general, the greater the STCR, the easier it is for a user to view virtual objects displayed by the see-through display region 112.

In FIG. 2B, the see-through dimming panel 204 is shown as being in a plane that is further from a user's eyes 240 than a plane that includes the see-through dimming panel 202 and the see-through display region 112. In an alternative embodiment, these two planes can be swapped such that the see-through dimming panel 204 is closer to the user's eyes 240 than a plane that includes the see-through dimming panel 202 and the see-through display region 112. Either way, the see-through dimming panel 204 can be said to overlap both the see-through dimming panel 202 and the see-through display region 112.

Figure 3A:
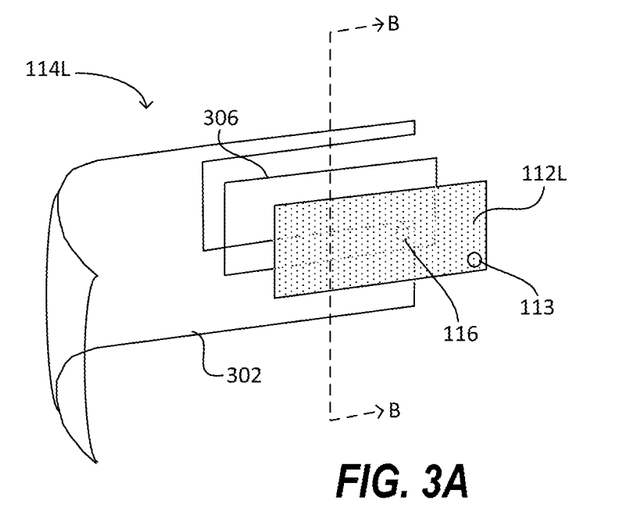
FIG. 3A illustrates components of a see-through, near-eye mixed reality display device introduced in FIG. 1, according to another embodiment.
Figure 3B:
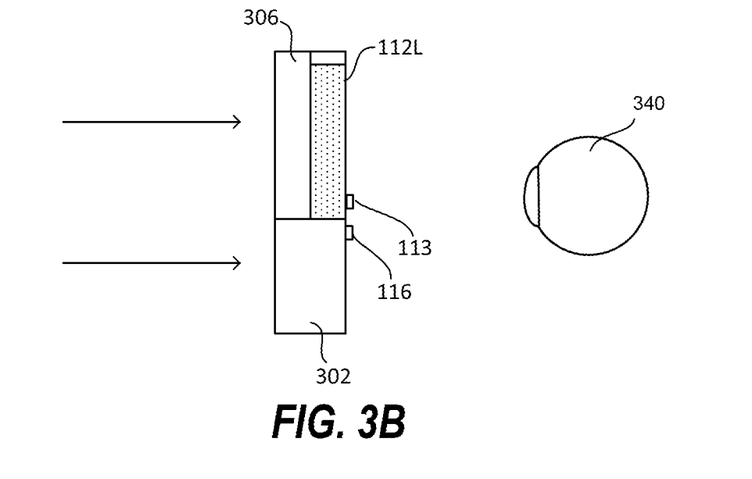
FIG. 3B is a cross-section of the components shown in FIG. 3A along line B-B in FIG. 2A.

FIG. 3A is an exploded view of some elements of the left portion of the head mounted display device 102 introduced in FIG. 1, according to an alternative embodiment. Referring to FIG. 3A, shown therein is the left see-through display sub-region 112L, which as noted above, is part of the see-through display region 112 along with the right see-through display sub-region 112R (shown in FIG. 1). Also shown in FIG. 3A is a left portion of a see-through dimming panel 302 that is adjacent to but not overlapping the left see-through display sub-region 112L. Although not shown in FIG. 2A, the see-through dimming panel 302 also includes a right portion that is adjacent to but not overlapping the right see-through display sub-region 112R. More specifically, in the embodiment of FIG. 3A, the see-through dimming panel 302 is coextensive with the see-through peripheral region 114 described with reference to FIG. 1. While in the exploded view of FIG. 3A the see-though dimming panel 306 and the see-through display region 112 are shown as being spaced apart from one another, the panel 306 may be in contact with the see-through display region 112, as shown in FIG. 3B, which illustrates a cross-section along the dashed line B-B in FIG. 3A. Alternatively, there can be an air gap or a see-through material (e.g., a lens) between the see-through dimming panel 306 and the see-through display region 112. There can also be a cavity or space between the dimming panels 202 and 204 that may contain other optical and/or electro-optical component(s), and/or one or more other types of component(s).

Preferably, the see-through display region 112 and the see-through dimming panel 302 collectively cover substantially the entire FOV of a user wearing the head mounted display device 102. Also shown in FIG. 3A is a further see-through dimming panel 306 overlapping the see-through display region 112. Although not shown in FIG. 3A, the see-through dimming panel 306 also includes a right portion that overlaps the right see-through display sub-region 112R. More specifically, in the embodiment of FIG. 3A, the see-through dimming panel 306 is coextensive with the see-through display region 112. In this embodiment, both the see-through display region 112 and the see-through dimming panel 306 are within a first portion of a FOV of a user wearing the head mounted display device 102, and the see-through dimming panel 302 is within a second portion of the FOV of a user wearing the device. Preferably, the see-through dimming panel 306 (which covers the see-through display region 112) and the see-through dimming panel 302 collectively cover substantially the entire FOV of a user wearing the head mounted display device 102.

The see-through display region 112 has an associated transmittance (Tr1), and the overlapping see-through dimming panel 306 has its own associated transmittance (Tr2). As mentioned above, where light travels through two different elements, each having their own transmittance, the collective transmittance of the two elements is equal to a product of the two transmittances multiplied. Accordingly, the collective transmittance of see-through dimming panel 306 and the see-through display region 112 is equal to the product of the transmittance of the see-through dimming panel 306 (Tr1) multiplied by the transmittance (Tr2) of the see-through display region 112 (e.g., equal to Tr1×Tr2). The see-through dimming panel 302 also has its own transmittance (Tr3). In accordance with an embodiment, a transmittance (Tr3) of the see-through dimming panel 302 is substantially the equal to the product of the transmittance of the see-through dimming panel 306 (Tr1) multiplied by the transmittance (Tr2) of the see-through display region 112 (i.e., Tr3≈Tr1×Tr2). Beneficially, this prevents some of the user's FOV from being darker than others. Explained another way, this provides for a substantially consistent brightness across the user's entire FOV.

In an embodiment, the see-through display region 112 has a static transmittance (i.e., Tr1 is static) and the see-through dimming panel 306 also has a static transmittance (i.e., Tr2 is static). In such a case, the see-through dimming panel 302 can be a static dimming panel having static transmittance (i.e., Tr3 is static) that is substantially the equal to the product of the static transmittance of the see-through dimming panel 306 (Tr2) multiplied by the static transmittance (Tr1) of the see-through display region 112 (i.e., Tr3≈Tr1×Tr2). Similar to panels 202 and 204 discussed above with reference to FIGS. 2A and 2B, the see-through dimming panels 302 and 306 can be made of glass, plastic or some other transparent material that is coated with a tinted film or mirror coated film that provides desired optical characteristics, e.g., desired transmittances. Alternatively, the transparent material from which one or both of the see-through dimming panels 302 and 306 are made can provide for the desired optical characteristics (e.g., a desired transmittance) without being coated with a tinted film or mirror coated film.

In accordance with an alternative embodiment, the see-through display region 112 has a transmittance that changes. In a similar manner as was discussed above with reference to FIGS. 2A and 2B, the transmittance (and/or other optical characteristics) of the see-through display region 112 may change, e.g., in response to user inputs, in response to signals from the control circuitry 136 and/or in response to signals from the light sensor 108, but is not limited thereto.

Where the see-through display region 112 has a transmittance that changes, at least one of the see-through dimming panels 302 and 306 should also have a transmittance that changes so that the transmittance (Tr3) of the see-through dimming panel 302 can remain substantially the equal to the product of the transmittance of the see-through dimming panel 306 (Tr1) multiplied by the transmittance (Tr2) of the see-through display region 112 (i.e., Tr3≈Tr1×Tr2). In one embodiment, both see-through dimming panels 302 and 306 have transmittances that change. In another embodiment, only one of the see-through dimming panels 302 and 306 have a transmittance that changes, while the other has a transmittance that is static. In an embodiment, the control circuitry 136 can control at least one of the changeable transmittances to maintain the relationship that the transmittance (Tr3) of the see-through dimming panel 302 is substantially equal to the product of the transmittance of the see-through dimming panel 306 (Tr1) multiplied by the transmittance (Tr2) of the see-through display region 112. Exemplary technologies that can be used to change the transmittance of the see-through dimming panels 302 and/or 306 were discussed above, and thus, need not be repeated.

Where the optical characteristics (e.g., transmittance) of one or more of the see-through display region 112, the see-through dimming panel 306 and/or the see-through dimming panel 302 can be changed, then signals produced by one or more of the light sensors 108, 113 and/or 116, shown in FIG. 1, can be used by the control circuitry 136 and/or the processing unit 104 to adjust such optical characteristics (e.g., transmittance(s)). For example, the light sensor 108 can detect ambient visible light that is incident on the sensor 108 and in response thereby can produce one or more signals indicative of one or more characteristics (e.g., intensity) of the detected ambient visible light. The one or more signals produced by the light sensor 108 can be provide to the control circuitry 136 and/or the processing unit 104, at least one of which can adjust the transmittance of the see-through display region 112, the see-through dimming panel 306 and/or the see-through dimming panel 302. Such an embodiment can be used, e.g., to maintain a substantially constant brightness for the user as ambient light levels change, while maintaining a substantially uniform brightness across substantially the entire FOV of the user.

In addition to, or instead of, using the light sensor 108 to detect characteristics of ambient light that is incident on an outer portion of the display device 102, the light sensor 113 can be used to detect characteristics (e.g., intensity) of light that has traveled through both the see-through dimming panel 306 and the see-through display region 112, and the light sensor 116 can be used to detect characteristics (e.g., intensity) of light that has traveled through the see-through dimming panel 302. Each of the light sensors 113 and 116 can produce one or more signals indicative of one or more characteristics (e.g., intensity) of the light detected by the sensor. Such signals produced by the light sensors 113 and 116 can be provided to the control circuitry 136 and/or the processing unit 104, at least one of which can adjust the transmittance (and/or other optical characteristics) of the see-through dimming panel 302, the see-through dimming panel 306 and/or the see-through display region 112 to achieve substantially uniform optical characteristics (e.g., a substantially uniform transmittance) across substantially the entire FOV of a user wearing the head mounted display device 102. The positions of light sensors 113 and 116 can be different than shown in the FIGS. It is also possible that multiple spatially separated light sensors 113 can be used to detect characteristics (e.g., intensity) of light that has traveled both the see-through dimming panel 306 and the see-through display region 112, and that multiple spatially separated light sensors 116 can be used to detect characteristics (e.g., intensity) of light that has traveled through the see-through dimming panel 302.

In accordance with certain embodiments, the see-through dimming panel 306 can be used to control the STCR associated with the portion of the device 102 that includes the see-through display region 112, e.g., to allow a user to adjust the STCR, or to maintain a substantially constant STCR. In these embodiments, for the portion of the device 102 that includes the see-through display region 112, STCR refers to the ratio of the total brightness of visible light emanating from the viewing side of the of the device 102 (which includes visible light emitted by the see-through display region 112 plus ambient visible light that passes through both the dimming panel 306 and the see-through display region 112) over the brightness of the ambient visible light emanating from the viewing side of the of the device 102 (which includes the brightness of the ambient visible light that passes through both the dimming panel 306 and the see-through display region 112). The STCR can be determined, e.g., based on signals received from one or more of the light sensors described herein, the transmittance of the see-through dimming panel 306 and/or the transmittance of see-through display region 112. Signals received from one or more of the light sensors described herein can be used in a closed loop feedback system to maintain a substantially constant STCR, which as mentioned above, can be a default STCR level, an STCR level specified by a user using a user interface, or an STCR level specified by an application that the device 102 executes.

In FIG. 3B, the see-through dimming panel 306 is shown as being in a plane that is further from a user's eyes 340 than a plane that includes the see-through display region 112. In an alternative embodiment, the see-through dimming panel 306 and the see-through display region 112 can be swapped such that the see-through dimming panel 306 is closer to the user's eyes 340 than a plane that includes the see-through display region 112. Either way, the see-through dimming panel 306 can be said to overlap both the see-through display region 112.

While transmittance is the optical characteristic discussed most often herein, it is also within the scope of an embodiment that other optical characteristics (besides or in addition to transmittance) of the see-through dimming panels 302 and/or 306 can be dynamically controlled so that such other optical characteristics remain substantially the same across substantially the entire FOV of a user wearing a head mounted display device 102 that includes the see-through display region 112 and the see-through dimming panels 302 and 306 that are described with reference to FIGS. 3A and 3B.

Optical characteristics, such as transmittance, spectral profile and color shift, are not necessarily constant over the entire visible light spectrum, wherein the visible light spectrum is typically considered to include wavelengths from about 390 nm to 700 nm. For example, a see-through dimming panel may have a 68 percent transmittance for portions of ambient visible light having a 600 nm wavelength, while the same see-through dimming panel may have a 72 percent transmittance for portions of ambient visible light having a 650 nm wavelength. Nevertheless, a further see-through dimming panel can have substantially the same transmittance of the exemplary see-through dimming panel just described if both dimming panels have substantially the same transmittance verses wavelength curves. In general, optical characteristics (such as transmittance, spectral profile and color shift) can be controlled using the various dimming panels described herein. For example, a dimming panel can include a simple passive color filter, or may include complex use of one or more active color filters that allow for user or feedback controlled adjustments to a spectral profile and/or color shift.

One or more of the see-through display region 112, see-through peripheral dimming panel 202, the see-through dimming panel 204, the see-through dimming panel 302 and/or the see-through dimming panel 306 can make up parts of eye glass lenses or can be attached to parts of eye glass lenses, wherein such eye glass lenses can be made to any prescription (including no prescription).

Where optical characteristics (e.g., transmittance) of more than one of the above described see-through components (e.g., 112, 202, 204, 302, 306) are being dynamically changed, changes to the optical characteristics (e.g., transmittances) are preferably synchronized to thereby provide for a collectively controlled and synchronized light control system. For example, multiple passive tinting films can be used to create a uniform see-through light distribution, and multiple active switchable film elements can be used to allow for synchronized, collective control of see-through light brightness level across substantially the entire FOV of the user. As can be appreciated from the above discussion, this synchronization may involve electronic control of the active optical components by the control circuitry 136 and/or processing unit 104. Since different types of active optical components may have different response characteristics (e.g., different response times to changes in applied voltages), such response characteristics should be understood so that changes to multiple active optical components can be performed in a synchronized manner.

During or after the assembly of one of the aforementioned embodiments of the head mounted display device 102, calibration and characterization of the resulting collective optical and electro-optical system can be performed. For example, a photometric measurement of controlled light rays through various optical elements (each of which may involve multiple points) can be performed to determine a default optical state of the system, to ensure appropriate selection of optical elements to create a uniform distribution of light intensity (and possibly other optical characteristics as desired) across substantially the entire field of view of a user. In addition to selection of optical elements, tuning may be done by electronic control of the active electro-optical elements. Active/dynamic control calibration and characterization can be done by performing time-varied photometric measurements and monitoring of electronic control signals, and performing tuning as required. Such calibration and characterization techniques can be used to ensure that optical properties and transitions are consistent across many optics in an optical path.

Figure 4A:
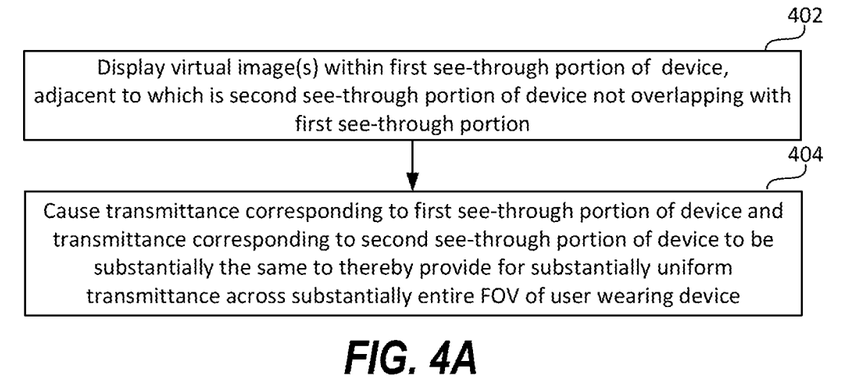
FIGS. 4A, 4B and 4C are high level flow diagrams that are used to summarize methods according to various embodiments of the present technology.

FIG. 4A is a high level flow diagram used to describe various methods for use with a user wearable see-through, near-eye, mixed reality, display device, such as the head mounted display device 102 described with reference to FIG. 1, FIGS. 2A and 2B, and FIGS. 3A and 3B.

Referring to FIG. 4A, at step 402, one or more virtual images are displayed within a first see-through portion of the device, adjacent to which is a second see-through portion of the device that does not overlap with the first see-through portion. Preferably, the first and second see-through portions of the device collectively cover a substantially entire field-of-view (FOV) of a user wearing the device. For example, referring briefly back to FIG. 1, the first see-through portion can correspond to the see-through display region 112, and the second see-through portion can correspond to the see-through peripheral region 114.

Referring again to FIG. 4A, at step 404, a transmittance corresponding to the first see-through portion of the device and a transmittance corresponding to the second see-through portion of the device are caused to be substantially the same to thereby provide for a substantially uniform transmittance across the substantially entire FOV of a user wearing the device.

The implementation of the steps in FIG. 4A will depend on the implementation of the head mounted display device. For example, in the implementation of FIGS. 2A and 2B, the first see-through portion of the head mounted display device 102 includes the see-through display region 112, and the second see-through portion of the head mounted display device 102 includes the see-through dimming panel 202 adjacent to but not overlapping the see-through display region 112. In such an implementation, step 402 can be performed by displaying the one or more virtual images within the see-through display region 112, and step 404 can be performed by causing a transmittance of the see-through dimming panel 202 (that is adjacent to but not overlapping the see-through display region 112) to be substantially the same as a transmittance of the see-through display region 112. In the embodiment of FIGS. 2A and 2B, since the further see-through dimming panel 204 overlaps both the see-through display region 112 and the see-through dimming panel 202, any change to the transmittance of the further see-through dimming panel 204 should equally affect that transmittance of the first and second see-through portions of the display device.

For another example, in the implementation of FIGS. 3A and 3B, the first see-through portion of the display device includes a see-through display region 112 and a see-through dimming panel 306 that overlaps the see-through display region 112, and the second see-through portion of the display device includes the further see-through dimming panel 302 adjacent to but not overlapping both the see-through display region 112 and the see-through dimming panel 306 that overlaps the see-through display region 112. In this implementation, step 404 comprises causing a transmittance of the further see-through dimming panel 302 to be substantially equal to a product of a transmittance of the see-through display region 112 multiplied by a transmittance of the see-through dimming panel 306 that overlaps the see-through display region.

Figure 4B:
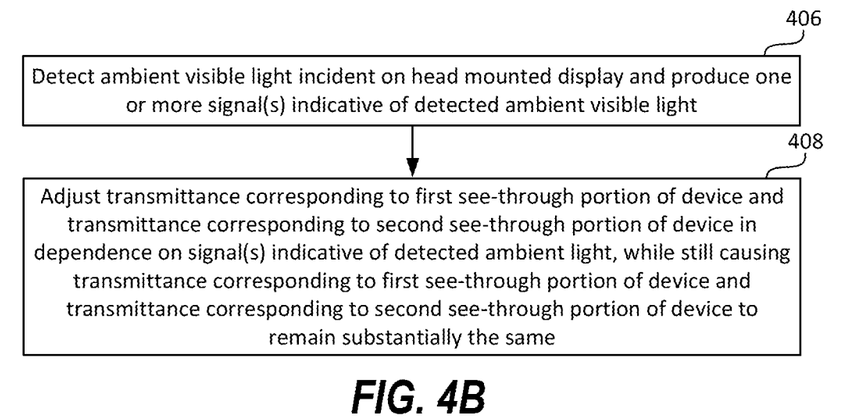

FIG. 4B will now be used to describe additional steps that can be performed. Referring to FIG. 4B, at step 406, ambient visible light that is incident on the head mounted display device is detected (e.g., using the light sensor 108 in FIG. 1) and one or more signals indicative of the detected ambient visible light is/are produced. At step 408, the transmittance corresponding to the first see-through portion of the device and the transmittance corresponding to the second see-through portion of the device are adjusted in dependence on at least one signal indicative of the detected ambient light, while still causing (at step 404) the transmittance corresponding to the first see-through portion of the device and the transmittance corresponding to the second see-through portion of the device to remain substantially the same. Steps 406 and 408 may be performed, e.g., to maintain a substantially constant brightness for the user as ambient light levels change, or to at least reduce the extent of the fluctuations in ambient light levels that reach the user's eyes.

Figure 4C:
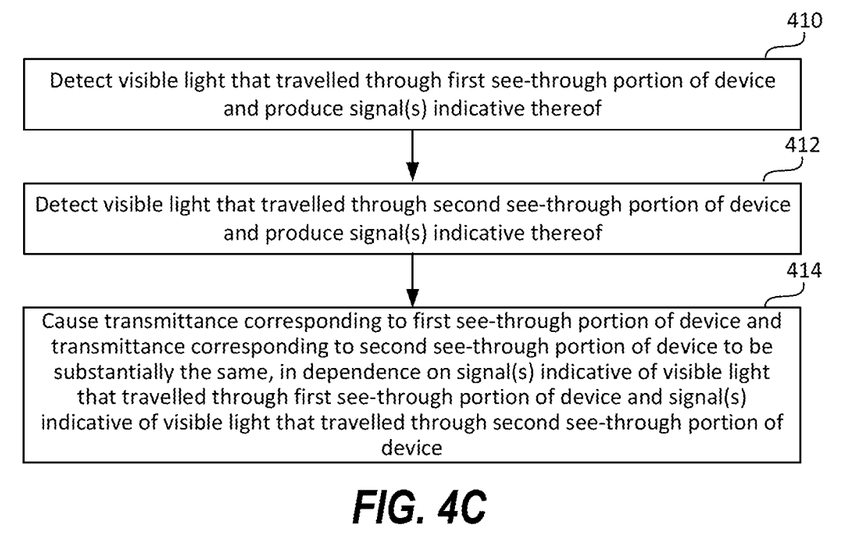

FIG. 4C will now be used to described steps that can be performed instead of (or in addition to) the steps described with reference to FIG. 4B. Referring to FIG. 4C, at step 410, visible light that traveled through the first see-through portion of the device is detected (e.g., using the light sensor 113) and one or more signals indicative of thereof is/are produced. At step 412, visible light that traveled through the second see-through portion of the device is detected (e.g., using the light sensor 116) and one or more signals indicative thereof is/are produced. At step 414, which can be implemented as part of step 404, the transmittance corresponding to the first see-through portion of the device and the transmittance corresponding to the second see-through portion of the device are caused to be substantially the same in dependence on at least one signal (produced at step 410) indicative of the visible light that traveled through the first see-through portion of the device and at least one signal (produced at step 412) indicative of the visible light that traveled through the second see-through portion of the device.

Figure 5:
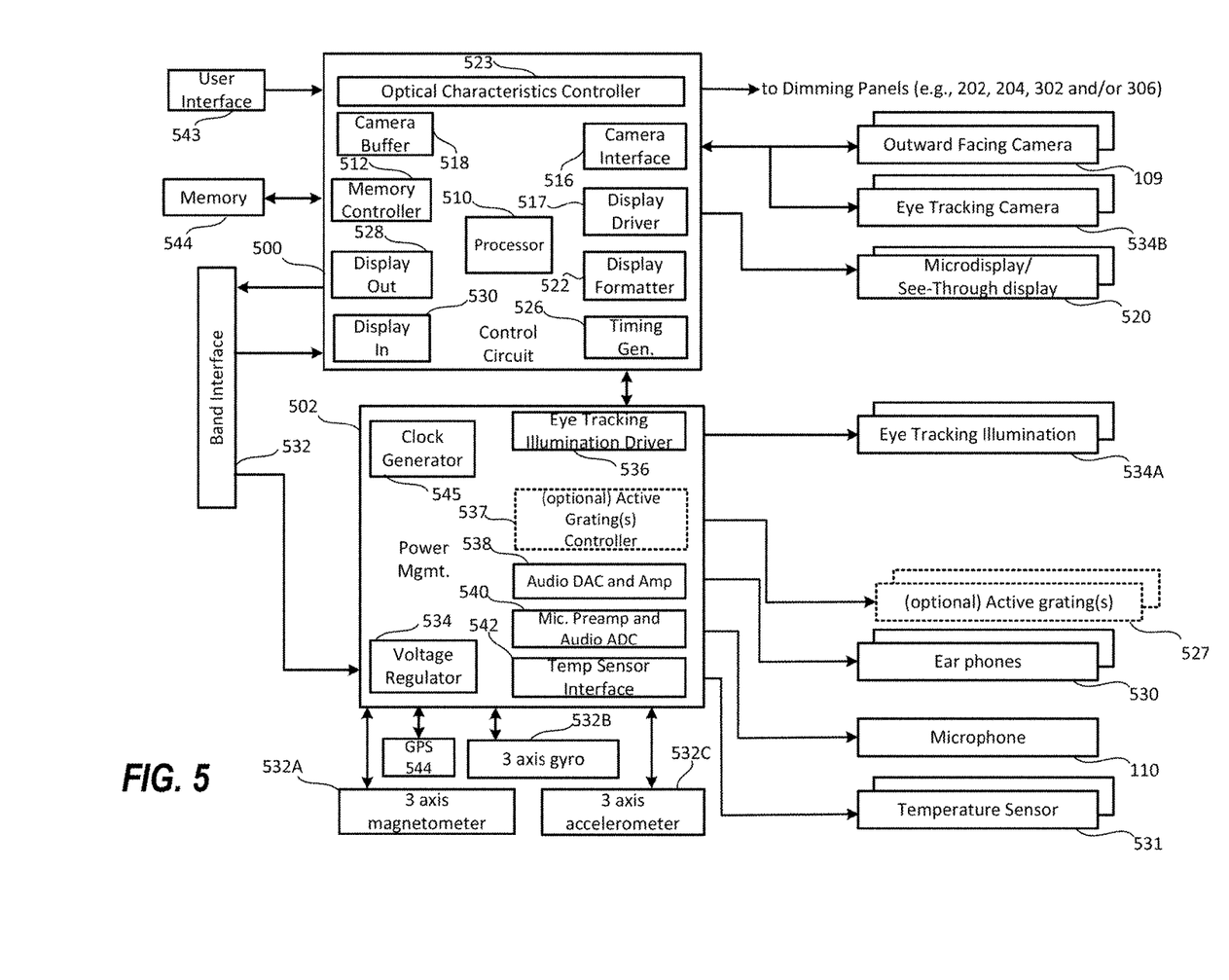
FIG. 5 is a block diagram of one embodiment of hardware and software components of a see-through, near-eye, mixed reality display device as may be used with one or more embodiments.
Figure 6:
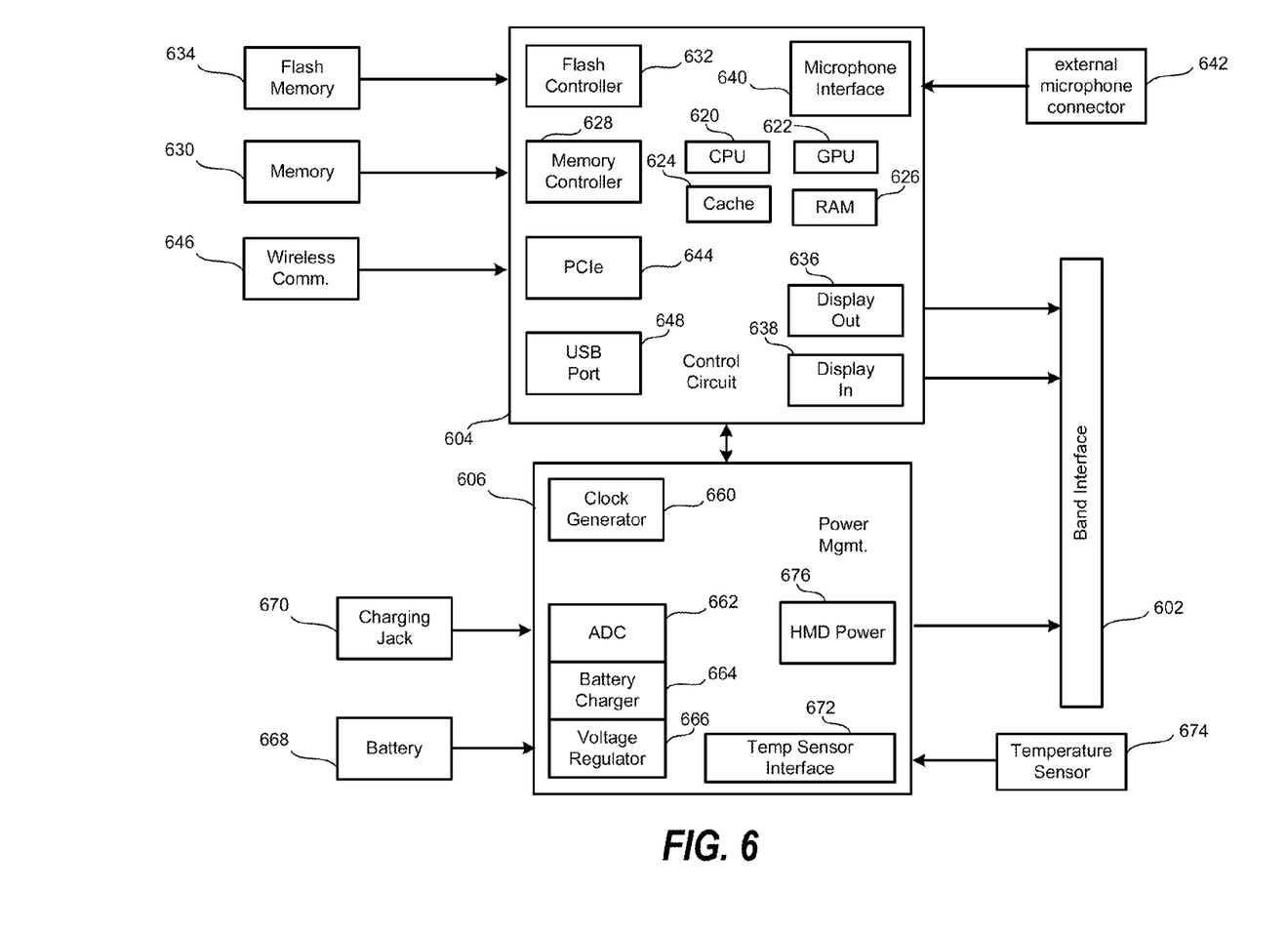
FIG. 6 is a block diagram of one embodiment of hardware and software components a processing unit as may be used with one or more embodiments.

FIG. 5 is a block diagram of one embodiment of hardware and software components of the see-through, near-eye, mixed reality head mounted display device 102 introduced in FIG. 1. FIG. 6 is a block diagram of one embodiment of hardware and software components of the processing unit 104 introduced in FIG. 1. In an embodiment, the head mounted display device 102 receives instructions about a virtual image from the processing unit 104 and provides data from sensors back to the processing unit 104. Software and hardware components that may be embodied in the processing unit 104, for example as depicted in FIG. 6, receive the sensory data from the head mounted display device 102 and may also receive sensory information from the computing system 152 over the network 150. Based on that information, the processing unit 104 can determine where and when to provide a virtual image to the user and send instructions accordingly to the control circuitry 136 of the head mounted display device 102.

Note that some of the components of FIG. 5 are shown in shadow to indicate that there can be at least two of each of those components, e.g., at least one for the left side and at least one for the right side of head mounted display device 102. FIG. 5 shows a control circuit 500 in communication with a power management circuit 502. The control circuit 500 includes a processor 510, memory controller 512 in communication with memory 544 (e.g., D-RAM), a camera interface 516, a camera buffer 518, a display driver 517, a display formatter 522, an optical characteristics controller 523, a timing generator 526, a display out interface 528, and a display in interface 530. In one embodiment, all of the components of the control circuit 500 are in communication with each other via dedicated lines of one or more buses, or using a shared bus. In another embodiment, each of the components of the control circuit 500 is in communication with the processor 510.

The camera interface 516 provides an interface to the one or two outwardly facing cameras 109, and in an embodiment, an IR camera as sensor 534B and stores respective images received from the cameras 109, 534B in the camera buffer 518. The display driver 517 can drive a micro-display device or a see-through micro-display 520. Display formatter 522 may provide information, about the virtual image being displayed on micro-display device or see-through micro-display 520 to one or more processors of one or more computer systems, e.g. 104 and/or 152 performing processing for the mixed reality system. Timing generator 526 is used to provide timing data for the system. Display out interface 528 includes a buffer for providing images from outwardly facing camera(s) 109 and the eye tracking cameras 534B to the processing unit 104. Display in interface 530 includes a buffer for receiving images such as a virtual image to be displayed on the micro-display device or see-through micro-display 520, or more generally, in the see-through display region 112. The display out 528 and the display in 530 communicate with the band interface 532, which is an interface to the processing unit 104.

The optical characteristics controller 523 controls the optical characteristics (e.g., transmittance and/or spectral profile, but not limited thereto) of the various dimming panels (e.g., 202, 204, 302 and/or 306) of the head mounted display device 102. The optical characteristics controller 523 can also control the optical characteristics of the see-through display region 112. Accordingly, the optical characteristics controller 523 can implement the methods described above with reference to FIGS. 4A, 4B and 4C. A user interface 543 can accept inputs from a user to enable the user to adjust the transmittance (and/or other optical characteristics) of the see-through display region 112 and/or the various dimming panels described herein. More generally, the user interface 543 enables a user to adjust optical characteristics of the see-through portions of the head mounted display device 102. To allow for such adjustments, the user interface 543 can include one or more buttons, sliders or some other tactile user interfaces located on the frame 115 of the head mounted display device 102. Alternatively, the user interface 543 can be provided by a mobile computing device (e.g., a smartphone or tablet) or the processing unit 104 that communicates with the head mounted display device 102. The optical characteristics controller 523 and/or the user interface 543 can also be used to control the STCR.

The power management circuit 502 includes a voltage regulator 534, an eye tracking illumination driver 536, an audio DAC and amplifier 538, a microphone preamplifier and audio ADC 540, a temperature sensor interface 542, an active filter controller 537, and a clock generator 545. The voltage regulator 534 receives power from the processing unit 104 via the band interface 532 and provides that power to the other components of the head mounted display device 102. The illumination driver 536 controls, for example via a drive current or voltage, the eye tracking illumination unit 534A to operate about a predetermined wavelength or within a wavelength range. The audio DAC and amplifier 538 provides audio data to the earphones 530. The microphone preamplifier and audio ADC 540 provides an interface for the microphone 110. The temperature sensor interface 542 is an interface for the temperature sensor 531. The active filter controller 537 receives data indicating one or more wavelengths for which each wavelength selective filter 527 is to act as a selective wavelength filter. The power management unit 502 also provides power and receives data back from the three axis magnetometer 532A, three axis gyroscope 532B and three axis accelerometer 532C. The power management unit 502 also provides power and receives data back from and sends data to the GPS transceiver 544.

FIG. 6 is a block diagram of one embodiment of the hardware and software components of the processing unit 104 associated with the see-through, near-eye, mixed reality head mounted display device 102. FIG. 6 shows a control circuit 604 in communication with a power management circuit 606. The control circuit 604 includes a central processing unit (CPU) 620, a graphics processing unit (GPU) 622, a cache 624, RAM 626, a memory control 628 in communication with memory 630 (e.g., D-RAM), a flash memory controller 632 in communication with flash memory 634 (or other type of non-volatile storage), a display out buffer 636 in communication with the see-through, near-eye head mounted display device 102 via a band interface 602 and the band interface 532, a display in buffer 638 in communication with the near-eye head mounted display device 102 via the band interface 602 and the band interface 532, a microphone interface 640 in communication with an external microphone connector 642 for connecting to a microphone, a PCI express interface for connecting to a wireless communication device 646, and USB port(s) 648.

In one embodiment, the wireless communication component 646 can include a Wi-Fi enabled communication device, Bluetooth communication device, infrared communication device, cellular, 3G, 4G communication devices, wireless USB (WUSB) communication device, RFID communication device etc. The wireless communication component 646 thus allows peer-to-peer data transfers with for example, another display device system 100, as well as connection to a larger network via a wireless router or cell tower. The USB port can be used to dock the processing unit 104 to another display device system 100. Additionally, the processing unit 104 can dock to another computing system 152 in order to load data or software onto the processing unit 104 as well as charge the processing unit 104. In one embodiment, the CPU 620 and the GPU 622 are the main workhorses for determining where, when and how to insert virtual images into the view of the user, and more specifically, into the see-through display region 112.

The power management circuit 606 includes a clock generator 660, an analog-to-digital converter (ADC) 662, a battery charger 664, a voltage regulator 666, a head mounted display (HMD) power source 676, and a temperature sensor interface 672 in communication with a temperature sensor 674 (e.g., located on a wrist band for the processing unit 104). The ADC 662 is connected to a charging jack 670 for receiving an AC supply and creating a DC supply for the system. The voltage regulator 666 is in communication with a battery 668 for supplying power to the system. The battery charger 664 is used to charge the battery 668 (via the voltage regulator 666) upon receiving power from the charging jack 670. In an embodiment, the HMD power source 676 provides power to the head mounted display device 102.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the present technology. For example, it would be possible to combine or separate some of the steps shown in FIGS. 4A, 4B and 4C. For another example, it is possible to change the boundaries of some of the blocks shown in FIGS. 5 and 6.

While embodiments described above where generally described as being directed to, or for use with, a see-through, near-eye mixed reality head mounted display device, many of the embodiments described above can be used with other types of see-through display devices that are not head mounted types of display devices. In other words, embodiments of the present invention are also directed to other types of see-through displays (and method for use therewith) that include at least one dimming panel that enables optical characteristics, such as transmittance, spectral response and/or color shift to be adjusted in response to an input from a user and/or based on closed-loop feedback from one or more light sensor(s). Additionally, or alternatively, embodiments described herein can be used to adjust the see-through contrast ratio (STCR) of the see-through display regions of such other see-though displays, e.g., based on user inputs and/or closed loop feedback. For example, a user interface can enable a user to adjust the brightness of a see-through display region, the transmittance of a dimming panel and/or the STCR associated with the portion of a see-through display device including the see-through display region. Additionally, or alternatively, a controller can adjust the brightness of the see-through display region and/or the transmittance of a dimming panel (that covers the see-through display region) to maintain a substantially constant STCR associated with the portion of the device including the see-through display region.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A see-through, near-eye mixed reality display device, comprising:
   a see-through display region within a first portion of a field-of-view (FOV) of a user wearing the device and having a first transmittance;
   a first see-through dimming panel overlapping the see-through display region, also within the first portion of the FOV of a user wearing the device, and having a second transmittance; and
   a second see-through dimming panel adjacent to but not overlapping the see-through display region and adjacent to but not overlapping the first see-through dimming panel, within a second portion of the FOV of a user wearing the device, and having a third transmittance;
   wherein one or more virtual images are displayable within the see-through display region.

2. The device of claim 1, wherein the first, second and third transmittances are adjustable, and further comprising:
   a controller that adjusts at least one of the first, second and third transmittances, when one of the one of the first, second and third transmittances is changed, so as to maintain the third transmittance being substantially equal to a product of the first transmittance multiplied by the second transmittance.

3. The device of claim 1, further comprising:
   a user interface that enables a user to selectively change at least one of the second and third transmittances;
   wherein when one of the second and third transmittances is changed, the other one of the second and third transmittances is also changed so at to maintain the third transmittance being substantially equal to the product of the first transmittance multiplied by the second transmittance.

4. The device of claim 1, further comprising:
   a sensor that detects ambient visible light that is incident on the sensor and produces one or more signals indicative of one or more characteristics of the detected ambient visible light; and
   a controller that adjusts both the second transmittance of the first active dimming panel and the third transmittance of the second active dimming panel in dependence on at least one of the one or more signals produced by the sensor so at to maintain the third transmittance being substantially equal to the product of the first transmittance multiplied by the second transmittance.

5. The device of claim 1, wherein:
   the first see-through dimming panel comprises a first active dimming panel which enables the second transmittance to change;
   the second see-through dimming panel comprises a second active dimming panel which enables the third transmittance to change;
   the first, second and third transmittances are optical characteristics, respectively, of the see-through display region, the first see-through dimming panel and the second see-through dimming panel;
   the see-through display region, the first see-through dimming panel and the second see-through dimming panel each have their own respective other optical characteristics, besides their own respective transmittances, said other optical characteristics including at least one of spectral profile or color shift; and
   one or more of the optical characteristic of one or more of the see-through display region, the first see-through dimming panel and the second see-through dimming panel is/are adjustable in response to at least one of
   a user input, or
   feedback received from one or more sensor of the device.

6. The device of claim 1, wherein at least one of a brightness of the see-through display region or the second transmittance is adjustable to thereby adjust a see-through contrast ratio (STCR) associated with the portion of the device including the see-through display region; and
   further comprising a user interface that enables a user to adjust at least one of
   the brightness of the see-through display region,
   the second transmittance, or
   the STCR associated with the portion of the device including the see-through display region.

7. The device of claim 1, further comprising:
   a controller that adjusts at least one of a brightness of the see-through display region or the second transmittance to thereby maintain a substantially constant see-through contrast ratio (STCR) associated with the portion of the device including the see-through display region.

8. The device of claim 1, wherein the device comprises a head mounted display device.

9. The device of claim 1, wherein the third transmittance is substantially equal to a product of the first transmittance multiplied by the second transmittance.

10. A method for use with a user wearable see-through, near-eye mixed reality display device, the method comprising:
    displaying one or more virtual images within a first see-through portion of the device, adjacent to which is a second see-through portion of the device that does not overlap with the first see-through portion,
       wherein the first see-through portion of the display device includes a see-through display region and a first see-through dimming panel that overlaps the see-through display region,
       wherein the second see-through portion of the display device includes a second see-through dimming panel adjacent to but not overlapping the see-through display region and adjacent to but not overlapping the first see-through dimming panel that overlaps the see-through display region, and
       wherein the first and second see-through portions of the device collectively cover a substantially entire field-of-view (FOV) of a user wearing the device; and
    causing a transmittance of the second see-through dimming panel to be substantially equal to a product of a transmittance of the see-through display region multiplied by a transmittance of the first see-through dimming panel that overlaps the see-through display region, to thereby cause a transmittance corresponding to the first see-through portion of the device and a transmittance corresponding to the second see-through portion of the device to be substantially the same, to thereby provide for a substantially uniform transmittance across the substantially entire FOV of a user wearing the device.

11. The method of claim 10, wherein:
    the displaying comprises displaying the one or more virtual images within the see-through display region.

12. The method of claim 10, further comprising selectively changing at least one of the transmittance of the first see-through dimming panel or a brightness of the see-through display region to thereby adjust a see-through contrast ratio (STCR) associated with the first see-through portion of the device.

13. The method of claim 10, further comprising:
   a detecting at least one of ambient visible light that is incident on the device, ambient visible light that traveled through the first see-through portion of the device, or ambient visible light that traveled through the second see-through portion of the device and producing one or more signals indicative thereof; and
   further comprising adjusting the transmittance corresponding to the first see-through portion of the device and adjusting the transmittance corresponding to the second see-through portion of the device in dependence on at least one said signal indicative of detected ambient light, while still causing the transmittance corresponding to the first see-through portion of the device and the transmittance corresponding to the second see-through portion of the device to remain substantially the same.

14. The method of claim 10, further comprising:
   controlling at least one of a spectral profile or a color shift corresponding to at least one of the first see-through portion of the device or the second see-through portion of the device.

15. The method of claim 10, further comprising selectively changing at least one of the transmittance of the first see-through dimming panel or a brightness of the see-through display region to thereby maintain a substantially constant see-through contrast ratio (STCR) associated with the first see-through portion of the device.

16. A method, comprising:
   providing first and second see-through portions of a user wearable see-through, near-eye mixed reality head mounted display device,
      wherein the first and second see-through portions collectively cover a substantially entire field-of-view (FOV) of a user wearing the head mounted display device,
      wherein the first see-through portion includes a see-through display region and a first see-through dimming panel that overlaps the see-through display region,
      wherein the second see-through portion is adjacent to and does not overlap the first see-through portion,
      wherein the second see-through portion includes a second see-through dimming panel that is adjacent to and does not overlap the see-through display region, and
      wherein the second see-through dimming panel is adjacent to and does not overlap the first see-through dimming panel that overlaps the see-through display region;
   displaying one or more virtual images within the first see-through portion of the display device; and
   using at least one of the first and second see-through dimming panels to provide for a substantially uniform transmittance across the substantially entire FOV of a user wearing the head mounted display device.

17. The method of claim 16, wherein the using at least one of the first and second see- through dimming panels to provide for a substantially uniform transmittance across the substantially entire FOV of a user wearing the head mounted display device comprises:
   causing a transmittance of the second see-through dimming panel to be substantially equal to a product of a transmittance of the see-through display region multiplied by a transmittance of the first see-through dimming panel that overlaps the see-through display region, to thereby cause a transmittance corresponding to the first see-through portion of the device and a transmittance corresponding to the second see-through portion of the device to be substantially the same, to thereby provide for a substantially uniform transmittance across the substantially entire FOV of a user wearing the head mounted display device.

18. The method of claim 16, wherein the displaying comprises displaying the one or more virtual images within the see-through display region.

19. The method of claim 16, further comprising selectively changing the transmittance of the first see-through dimming panel to thereby maintain a substantially constant see-through contrast ratio (STCR) associated with the first see-through portion of the head mounted display device.

20. The method of claim 16, further comprising selectively changing a brightness of the see-through display region to thereby maintain a substantially constant see-through contrast ratio (STCR) associated with the first see-through portion of the head mounted display device.

* * * * *